United States Patent [19]

Girardin

[11] Patent Number: 5,420,388
[45] Date of Patent: May 30, 1995

[54] TOOL-HOLDER AND RAPID ROTARY SPINDLE

[75] Inventor: Roger Girardin, Vernier, Switzerland

[73] Assignee: Charmilles Technologies, Meyrin, Switzerland

[21] Appl. No.: 957,621

[22] Filed: Oct. 6, 1992

Related U.S. Application Data

[63] Continuation of Ser. No. 613,779, Nov. 29, 1990, abandoned.

[30] Foreign Application Priority Data

Mar. 29, 1989 [CH] Switzerland ............ 1128/89

[51] Int. Cl.⁶ .............................. B23H 7/26
[52] U.S. Cl. ................ 219/69.15; 279/20; 408/59
[58] Field of Search ........... 219/69.15, 69.12, 69.14; 279/20; 173/72, 73; 408/56, 57, 58, 59, 60, 61; 204/224 M

[56] References Cited

U.S. PATENT DOCUMENTS

| | | | |
|---|---|---|---|
| 2,818,490 | 12/1957 | Dixon et al. | 408/59 |
| 3,487,748 | 1/1970 | Grage | 408/59 |
| 4,628,171 | 12/1986 | Colby et al. | 219/69.2 |
| 4,640,652 | 2/1987 | Rivera, Jr. | 279/20 |
| 4,705,932 | 11/1987 | Aso et al. | 219/69.14 |
| 4,795,292 | 1/1989 | Dye | 279/20 |
| 4,867,618 | 9/1989 | Brohammer | 408/59 |
| 4,957,398 | 9/1990 | Schneider et al. | 408/56 |
| 5,028,178 | 7/1991 | Ronen | 279/20 |

FOREIGN PATENT DOCUMENTS

| | | | |
|---|---|---|---|
| 2577156 | 8/1986 | France | 219/69.2 |
| 60-259331 | 12/1985 | Japan | 219/69.15 |
| 62-157721 | 7/1987 | Japan | 219/69.14 |
| 62-287942 | 12/1987 | Japan | 219/69.15 |
| 62-292321 | 12/1987 | Japan | 219/69.2 |

*Primary Examiner*—Geoffrey S. Evans
*Attorney, Agent, or Firm*—Gifford, Groh, Sprinkle, Patmore and Anderson

[57] ABSTRACT

Tool-holder (5) makes it possible to rotate a tool at high speed around its axis of symmetry. Its tapered end (26) is engaged in the tapered bore (16) provided in the spindle (6). In a bore of suitable shape a clamp (2) is engaged, adapted to secure the electrode tool end (1) rigidly. An injection chamber (28) communicates with the bore and is connected by radial channels (27) to a fluid inlet. The clamp (2) has radial grooves to bring the cooling fluid (25) from the injection chamber (28) to the surface of the tool (1). A sealed circuit (12,13,15) channels the liquid; it is connected by an input channel of small diameter which passes through the spindle body (10) to a small liquid inlet in the mobile element of the machining head or in the intermediary fixing element mounted on said mobile element. An annular seal (14) of small diameter is mounted in the spindle body around said channel (11').

8 Claims, 3 Drawing Sheets

TOOL-HOLDER AND RAPID ROTARY SPINDLE

This is a continuation of application Ser. No. 07/613,779 filed on Nov. 29, 1990, now abandoned.

The present invention relates to a tool-holder and a spindle, making it possible to carry along a tool rotating around its axis of symmetry, as well as fastening it, in such a way that it can be detached, to a machining head, which can itself be designed, for rotating the spindle/tool assembly around an axis of rotation parallel to this axis of revolution. It relates, in particular, to tool-holders and spindles suitable for holding electrode tools for electrical machining used, for example, in EDM drilling, turning and milling.

Tool-holders and rotary spindles are known which can be fastened to a machining head and can come and go along its axis of symmetry (Z axis) and also move around this axis in a circular movement, with the possibility that this movement can be angularly indexed (C axis). In the field of electrical machining, such devices are used above all for boring holes using long hollow electrodes, the cooling of which is provided for by fluid circulating inside the electrode tool. We may mention, in particular, the devices described in Swiss patent CH 628.557 or in European patent application EP 173.749.

But none of the existing devices allow machining with a rotary spindle at speeds of several thousand revolutions per minute, especially with a solid tool. This was due to the difficulty of providing an adequate machining fluid supply to cool the tool, the tool-holder and the rotary spindle (this supply having to be all the more efficient as the spindle rotates more rapidly), in particular because the seals could not withstand the flows and the rotation speeds of several thousand revolutions per minute used for certain applications. Serious seal wear problems rapidly appeared which put the equipment out of service.

Now such speeds are necessary in certain cases, such as EDM milling, in particular using narrow-diameter electrode rods, in order to obtain adequate machining speeds.

The purpose of the present invention was therefore to obtain a tool-holder and a rotary spindle which could be fastened to a machining head already equipped, for example, with Z and C axes, and would make it possible to machine at rotation speeds of several thousand revolutions per minute. The tool-holder and the device with the spindle as per the present invention, as defined in claims 1 and 5, allow such machining to be carried out.

Thanks to the injection device, in particular to the annular injection from which the device as per the present invention benefits, not only the tool, but also the tool-holder and the spindle, can be efficiently cooled without any loss of tightness occuring at the seals, in particular at the O-ring seal connecting the spindle to the spindle body, which makes it possible to carry out machining at 2,000 revolutions per minute and more, for example at 5,000 revolutions per minute for at least a month, or more. It is possible to obtain speeds of 10,000 revolutions per minute. In the case of electrical machining, in particular EDM machining, this makes it possible to power the electrode tool with high-density currents which may exceed 100 /cm.2, without any fear of heating due to an excessively high Joule effect and loss of accuracy due to deformation of the device.

In accordance with one of the specific embodiments of the present invention, the liquid inlet channel in the spindle, around which is fitted an annular seal, has as small a diameter as possible (for example, for a 100 mm. diameter spindle, the channel has a diameter of 6 mm.). This seal links the cooling circuit of the rotary spindle to a coolant distribution chamber located in the spindle body. It is intended to provide a tight channel for the coolant liquid coming from the machining head and injected around the tool through the spindle body, the rotary spindle and the tool-holder. This leads to as low a peripheral speed as possible for this inlet channel with respect to the seal, and thus increases the latter's resistance to the rapid rotation movement and its service life. Thus as narrow an inlet channel as possible should be used, although it must be adequate for the provision of a satisfactory coolant liquid flow.

In accordance with another specific embodiment of the present invention, the motor controlling the rotation of the spindle is mounted outside the assembly formed by the spindle body and the rotary spindle, and the spindle body/spindle/tool-holder/tool assembly is sufficiently compact to be handled by automatic electrode changers, usually equipped with a robot arm and of a known type, and to be stored in classic tool magazines.

In accordance with other variants, the rotary motor can be fitted with an encoder and a divider, making it possible to position the rotary spindle (and therefore the tool-holder and the tool) angularly at a given angle to a reference position located before the rotation as per the C axis begins. This makes it possible to eliminate problems arising from the weight of the angular sensor and to obtain a good balance during high-speed rotation, inasmuch as all the elements of the spindle body/spindle/tool-holder/tool assembly are rotating bodies.

The connection between the rotating spindle and the motor, when it is attached to the machining head and moves integrally with the moving element of the head, can be provided through a link element protecting, for example, a belt transmitting the movement of the motor to the spindle. In certain versions of the device covered by the present invention, this link element is fitted with features, such as magnetic components, working together with the motor or with meshing or grips provided on the top of this element and intended to insert themselves into corresponding components provided at the base of the motor. This does not interfere with the transmission of the rotation of the motor to the spindle. The level at which the motor is attached to the machining head can be regulated in such a way that it works together with the link element, whatever may be the height of the device with the spindle.

The moving element of the machining head to which is attached the spindle body/spindle/tool-holder/tool assembly can in general move in a known manner, as per the Z and C axes, and this latter movement can be indexed. A three-axis rotary spindle is thus obtained, and the C axis can be used for the automatic locking and releasing of certain elements of the above assembly.

The spindle body/spindle/tool-holder/tool assembly can be mounted on the machining head through the intervention of a standard commercially available coupling component. In general, this component remains attached to the machining head, and is equipped with suitable features working together with the fasteners with which spindle bodies according to invention are provided.

The coupling components are preferably made in such a way that they can be locked and released automatically thanks, in particular, to pneumatic or hydraulic systems of a known type, activated by the numerical control of the machine. This allows a wide variety of spindle body/spindle/tool-holder/tool assemblies to be put together in advance and stored in an accessory magazine of a known type before being automatically mounted on the same machining head, without changing the reference positioning of the latter or its coupling component. Moreover, according to the accessory manufacturer, the same component, mounted on the machining head, can be coupled to various types of fastenings mounted on the spindle bodies. This assembly thus generally comprises the spindle body itself with the fastening allowing it to be mounted on the standard coupling component with which the head is fitted. Thanks to a robot changer of a known type, this also makes it possible to take a blunted tool to a touching up station and re-mount it directly into the machining position without having to carry out any adjustment.

Moreover, the coupling component attached to the machining head is preferably made in such a way as to transmit the signals from the numerical control of the machine to the motor driving the spindle, in such a way as to regulate, for example, the speed at which the spindle rotates about its own axis, by arranging for it to be controlled by the variation in a parameter measured during machining, or again, in such a way that the milling and movement sequences as per the C and Z axes are automatically controlled by the numerical control of the machine tool, for example.

As already mentioned above, the spindle body/spindle/tool-holder/tool assembly can be automatically changed by a simple movement of a robot arm between the machining head and a magazine for assemblies with tools of different types and shapes (classical EDM sinking tools, EDM 'millers', etc.), synchronised with suitable signal transmitted by the numerical control in order to control the locking or releasing of certain fastenings. Or again, when the tool-holder can be mounted on the rotating spindle and removed from it automatically, it is possible to change only the tool/tool-holder assembly associated with the rotary spindle device automatically, keeping the same spindle. It is thus no more needed to have as much spindles than tools.

The tool-holder and the device with spindle covered by the present invention can thus offer an infinite number of production formats. Only certain of these will be schematically illustrated by the description of a typical embodiment, with the assistance of the attached drawing, which shows a tool-holder in accordance with the present invention, gripping an EDM milling electrode and fixed into a rotary spindle driven by a motor mounted outside the spindle/spindle body assembly.

Figure 1:
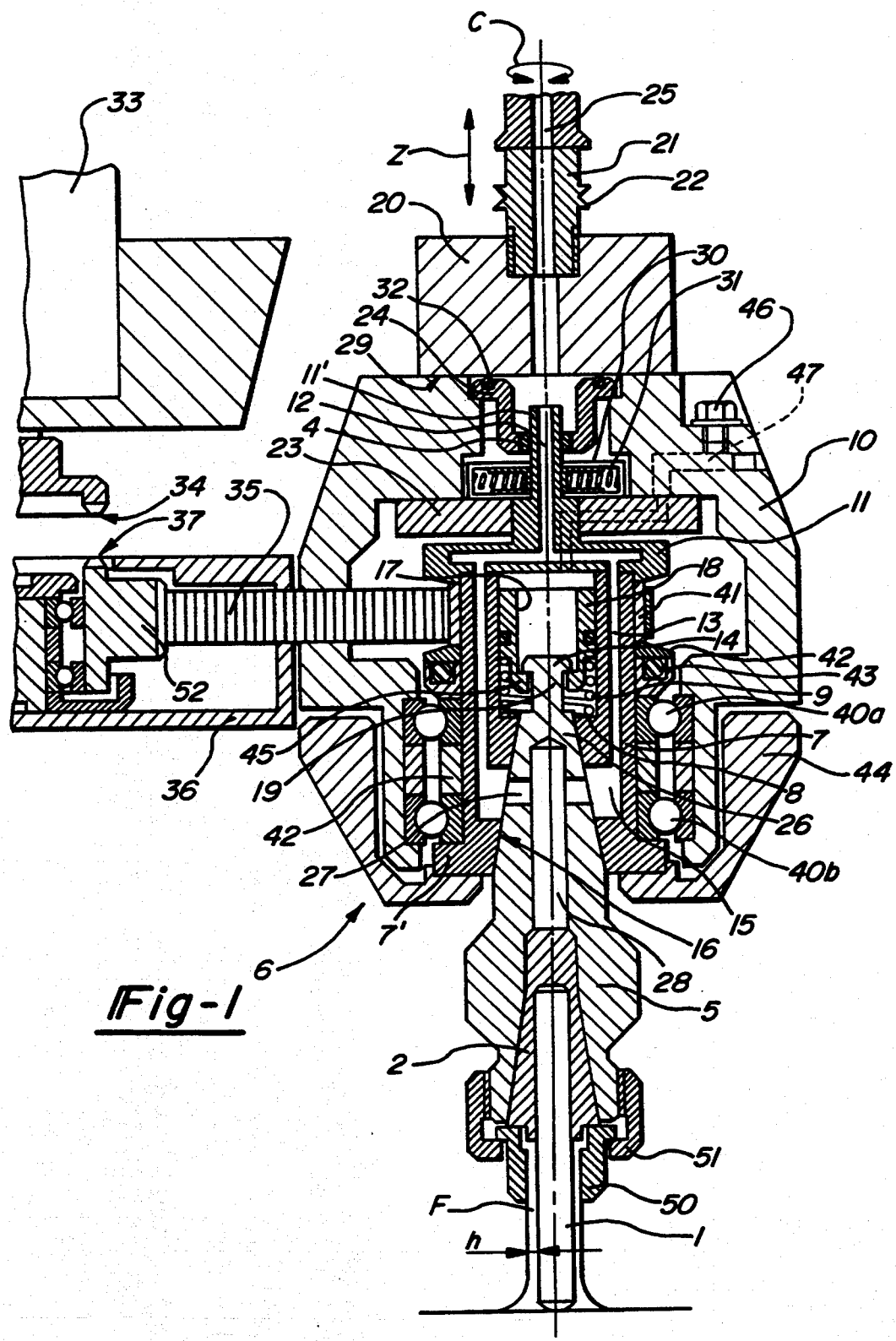
FIG. 1 shows an axial section of an electrode assembly.
Figure 2:
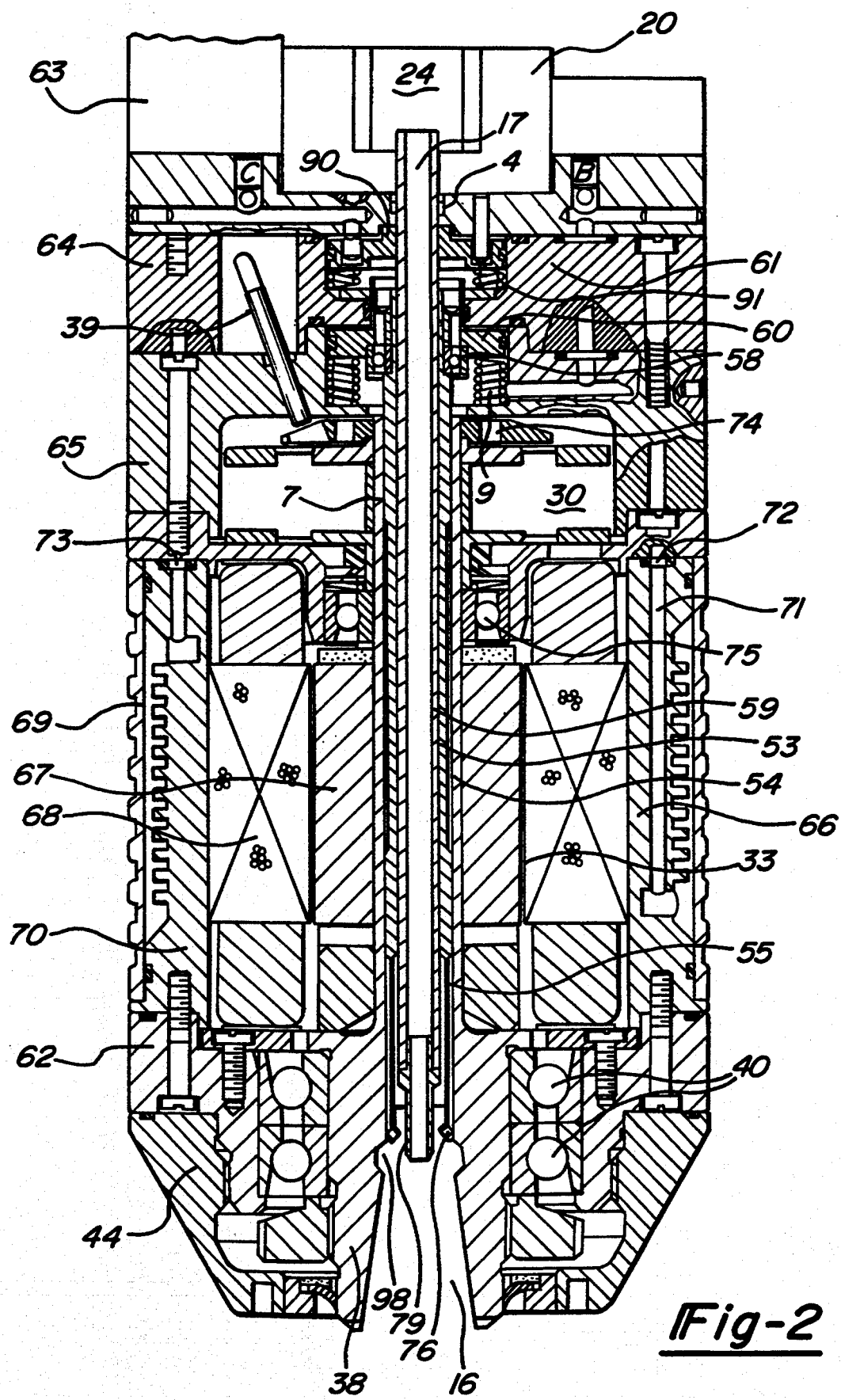
FIG. 2 shows a second embodiment of an electrode holder and spindle assembly.
Figure 3:
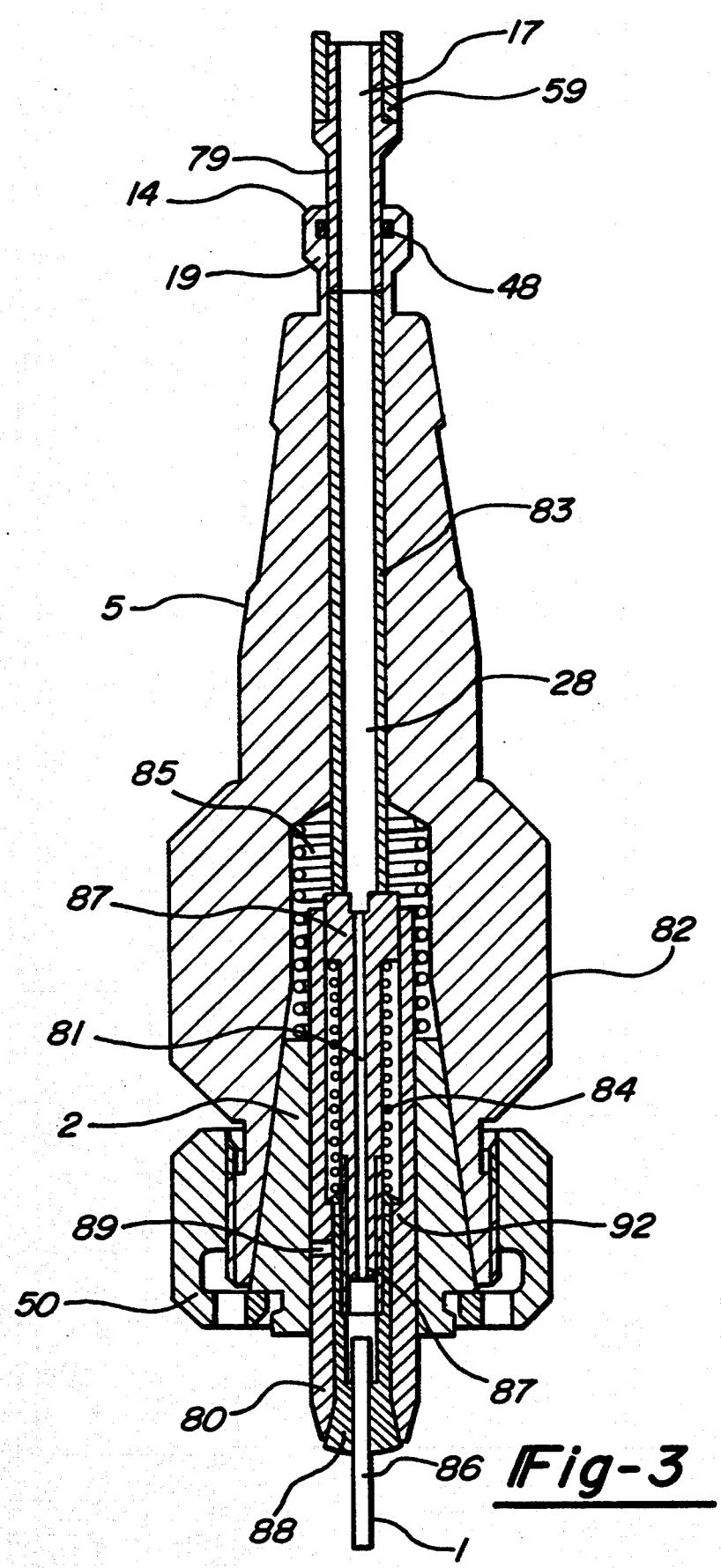
FIG. 3 shows a spindle attached to an electode holder.

Diagram 1 shows an axial section of an assembly comprising an electrode tool, 1, in the form of a cylindrical rod gripped in the clamp, 2, of a tool-holder, 5. The latter is fixed in a rotary spindle, 6, mounted in a spindle body, 10. The latter is connected by known means to a fastening element of a known type, shown in outline form at 20.

The fastening, 20, constitutes a first coupling element, and can be automatically mounted and removed from a second coupling element, not shown, which is constituted by a chuck and is fixed by known means to the moving part of an EDM machining head (also of a known type and not shown). This component, 20, is made up of a gripping rod, 21, with a groove, 22. In a known way, the chuck which constitutes the second coupling element is equipped with a mechanism which, in its "at rest" position, causes ball bearings to penetrate into the groove, 22, thus providing the fastening. By the application of hydraulic or pneumatic pressure, this mechanism is operated in such a way as to release the bearings, which makes it possible to withdraw the rod, 21. The robot arm making it possible to move the device covered by the present invention from the machining head to an accessory magazine, a turning station or a touching up station, or a rack (to remove the tool-holder or mount another, as explained below), comes and grips it below the groove, 22.

The machining head is equipped with servo-mechanisms, operated by the numerical control of the EDM machine and making it possible to move this mobile element vertically (Z axis) and rotate it around an axis parallel to this Z axis (C axis, indexed if necessary). The component, 20, is attached to the spindle body, 10, by screws (not shown).

The vertical sleeve, 7, of the spindle, 6, is hollow; it surrounds a cylindrical chamber, 17, coming out into a conical recess, 16, after delimiting a shoulder, 8. The latter acts as a support for the spring, 9, which pushes the brace piston, 18, back towards the top of the chamber, 17.

The sleeve, 7, carries a circular component, 11, from the centre of which a rod, 11', pierced by a channel, 12, rises perpendicularly. The channel feeds coolant liquid, 25, to branches, 13, arranged all around the sleeve, 7, parallel to its axis of symmetry. They are numerous enough (4) to provide sufficient irrigation.

The 6-mm. diameter seal, 4, surrounds the upper end of the rod, 11', while leaving it free to rotate around its own axis. The seal is made of Viton (marketed by Rubeli and Guigoz). Any other suitable known seal can be used for this component, 4.

An annular recess, 15, open to the tapered bore, 16, in the lower part of the sleeve, 7, constitutes an injection chamber supplied by the branches, 13. This chamber communicates with channels, 27, arranged radially in the tool-holder, 5.

This component, 11, is attached to the sleeve, 7, by screws (not shown), in such a way as to hold the pinion, 41, the component, 42, surrounding the O-ring seal, 43, and the ball bearings, 40a and 40b, against the shoulder, 7', of the sleeve, 7. The seal, 43, makes it possible to pre-load the oblique contact bearings, 40a and 40b. The latter connect the spindle to the spindle body and allow it to turn rapidly around its own axis while the spindle body remains stationary. A guard, 44, is screwed on this shoulder, 7'. The sides of the guard are sloping to ensure that its overall dimensions in the machining area are as small as possible.

Inside the cylindrical chamber, 17, is mounted a brace piston, 18, moved upwards by the spring, 9, and supporting the projecting part, 19, of the tool-holder, 5. The base, 45, of this component, 18, is pierced by a central slot crossing right through it, intended to engage with the wider area 14 at the end of this projecting part, 19.

The tapered section, 26, of the tool-holder, 5, is intended to go into the bore, 16, of the spindle, 6. We have seen that the projecting part, 19, which is an extension of this tapered section, 26, ends in a wider rectangular area, 14, the dimensions of which, taken in a plane perpendicular to the axis of symmetry of the tool-holder, are slightly smaller than the dimensions of the slot in the end of the piston, 18. If the tool-holder is given a quarter-turn, this area, 14, is held by the base, 45, of the component, 18.

The mounting and removal of the tool-holder, 5, can be done automatically, for example by fixing it in position in a rack opposite the slot in the base, 45, of the component, 18. All that is needed is to lower the device along the Z axis and to unlock the spindle, 6, a quarter of a turn and raise it along the Z axis. To unlock the device, a fluid (oil or compressed air, for example) is injected under pressure at the top of the chamber, 17. This pushes the piston, 18, downwards; it is sufficient, when reversing the above operations, to rotate the tool-holder a quarter of a turn to release it from the base, 45, of the piston, 18, and thus free it from the spindle, 6. Conduits, 47, shown as dotted lines, as they are interspersed between the coolant liquid feed channels, 13, bring the pressurised fluid from the pneumatic or hydraulic supply 46 to the chamber, 17. The fluid can be released through a valve operated automatically when the spindle body is connected to the machining head. These conduits are to be found in the spindle body, 10, in the annular component, 23, mounted under it, and in the component, 11.

The machining current is supplied to the device by two hollowed out carbon brushes, 30, pressed against the rod, 11', by two springs, 31. It is transmitted to the electrode tool, 1, through the spindle, 6, and the tool-holder, 5, hence the importance of efficient cooling for the spindle/tool-holder assembly.

The spindle body, 10, thus acts as a distribution chamber, 24, for the coolant liquid, 25. All that is needed is to fit the spindle body, 10, onto the cylindrical rod, 11', of the spindle, 6. It is only when this rod has been centred with respect to the fastening, 20, that the body, 10, is aligned with the fastening, the seal, 32, of the component, 24, locating itself freely along the plane, 29.

A cylindrical bore creates an injection chamber, 28, in the tool-holder, 5, supplied by radial grooves, 27, and communicating with a bore shaped in such a way as to receive the clamp, 2. The latter is pierced by radial grooves allowing the pressurised liquid, 25, to flow out of the chamber, 28, to the surface of the electrode, 1.

To fix the electrode, 1, in the tool-holder, 5, it is sufficient to engage the clamp, 2, in the seating provided in the component, 5, and then the electrode, 1, to position the injector, 50, and to retain the whole by screwing the nut, 51, onto the lower end of the tool-holder, 5. The annular injector 50 is shaped in such a way as to leave a space, h, between its wall opposite the electrode, 1, and the surface of the latter. This space, h, is determined on the basis of the geometry of the equipment, the viscosity of the coolant liquid, 25, and its injection pressure, in such a way that a film of liquid, F, surrounds the electrode, 1.

Clamps, 2, of different shapes can be provided in order to match them to tools of various forms and weights.

The motor, 33, has grips, 34, on its lower part which engage with the corresponding grips, 37, on the link element, 36. The belt, 35, transmits the rotation of the pinion, 52, operated by the motor, 33, to the pinion, 41, of the spindle, 6. The ball bearings, 40a and 40b, allow the assembly formed by components 7, 11 and 11', 18, 42 and 44 to rotate inside the spindle body, 10.

The motor, 33, is connected to the numerical control of the machine. Thanks to a servo-mechanism and a servo circuit of known type, such as those described in European patent application 281.512, the frequency of rotation of the motor, 33 (and thus of the device covered by the present invention) is regulated on the basis of the variation in the instantaneous voltage, Ui, of each spark generated between the electrode tool, 1, and the machined workpiece. This makes it possible to rotate the tool, 1, at the maximum speed, while avoiding machining faults and the deterioration of the dielectric bathing the machining area, but with a degree of pollution of the machining slot sufficiently high for the removal of material to be as great as possible for the current density used, but slightly below that which would bring about a deterioration in the machining conditions or even a complete halt to machining, as a result of the destruction of the dielectric. This device makes it possible to obtain the optimal rotation speed, corresponding to the maximum amount of material removed for a given current density.

Obviously, numerous variations are possible. Thus, as already mentioned, the motor, 33, providing the drive for the rotation of the spindle, 6, in the spindle body, 10, can be mounted in the latter. In this case, the belt, 35, can be omitted (as well as the entire link element, 36), the motor, 33, operating the pignion 41, of the spindle, 6, directly.

In the case of the motor, 33, is external the grips, 34 and 37, connecting it to the link element, 36, can be replaced by other known systems, such as a magnetic link.

The spindle body could be mounted on the machining head using other known systems differing from the coupling components, 20 to 22, whether automatic or not.

It is also possible to envisage other systems for fastening the tool-holder into the spindle, or for fastening the spindle to the spindle body, or again for attaching the spindle body to the fastening, 20. However, we have seen that it is advantageous to provide fastenings allowing automatic locking and release (activated by means of the numerical control and by hydraulic or pneumatic means, or again by electrical or magnetic means) between the spindle body and its coupling component and the machining head, on the one hand, and between the tool-holder and the spindle, on the other hand.

In particular, one of the variations described in patent CH 572. 787, or any other known system, such as a fastening using ball bearings and locking sockets, can be used to fasten the tool-holder, 5, into the spindle, 6.

Means other than the nut, 51, can also be envisaged for maintaining the annular injector, 50, the clamp, 2, and the tool, 1, in the tool-holder, 5.

The coolant liquid circuits of the spindle and the tool-holder may be different from those illustrated in the example above.

Instead of rotating with the spindle, 6, the guard, 44, can be mounted on the spindle body, 10, and remain stationary while the spindle, 6, is rotating.

Other variations may turn out to be very advantageous. For example, especially when the electrode tool is no longer a fine rod, this tool can be pierced by channels making it possible to irrigate it more efficiently in order to prevent it from heating. In this case, it may be advantageous to provide a clamp, 2, having a central channel communicating with a central channel pierced in the end of the tool gripped in this clamp.

It is also possible, as described in patent CH 572.787, for the tool-holder to have a side stud which operates together with a stop on the spindle, 6, so that it can be given an angular position determined with respect to the machining head (as with the tool, 1). The tool-holder (and thus the tool) can therefore be positioned in its mounting with great accuracy, with regard to both its centring and its angular position. It should be remembered that this type of fastening makes it possible to control the clamping force and to carry out rapid and efficient locking movements. It is easy to clean the various components. Maximum precision can thus be obtained in all conditions of operation. Moreover, the clamping force is weak enough for deformation effects after clamping to be negligible. It is approximately constant, which makes it possible to obtain a rigorously defined position each time a new tool-holder is put into place.

As explained above, the tool-holder and the device with rotating spindle covered by the present invention are particularly valuable in EDM milling.

Rotating spindles in accordance with the present invention are generally equipped with means by which their frequency of rotation (and thus that of the electrode) can be regulated, for example by setting up a servo-mechanism in such a way as to monitor the low-level spark rate and the ejected spark rate, and to machine at the optimum rotation speed corresponding to the maximum amount of material to be removed for a given machining current, as described in EP 281.512, and to do this without there being any surface faults.

It is thus possible, not only to combine the advance of the electrode tool along the machining trajectory with an angular movement tangential to the machining surface or with a linear movement parallel to this surface, but also to associate these three types of movement. Thus a rotation of the electrode tangential to the surface machined can be combined with a to-and-fro movement parallel to its axis of rotation (and thus to this surface). It is also known that the electrode, while rotating around its own axis, can also rotate around an axis (C axis) parallel to the axis of this first rotation. These various rotary or linear movements can also be associated with various pulsations, vibrations or oscillations of the electrode, such, for example, as the micro-trajectories described in Swiss patent 646.894, as well as with various linear or angular to-and-from movements.

It is also possible to move the component to be machined linearly or angularly, relative to the electrode-tool, 1, thus carrying out 'EDM turning' instead of 'EDM milling'.

We have seen above that one of the main advantages of the present invention is that it makes it possible to work with a machining current density rare in EDM, i.e. higher than 10 A/cm.2, preferably higher than 50 /cm.2, and capable of reaching 100 A/cm.2. This makes it possible, in particular, not only to drill or bore circular holes, ream and polish, as was already possible with EDM using known rotary electrode tools, but also to carry out veritable 'milling' using spark erosion. Very complicated forms can now be machined using a very simple form of electrode. Above all, thanks to this high current density, large-dimension components can be machined using small-dimension electrodes, in contrast to traditional electro-erosion where the electrode tool has approximately the same volume as the shape to be eroded.

Being simple in form, these electrodes can be mass-produced, in a similar way to the wire electrodes already known. This makes considerable progress possible by comparison with the traditional sinking electrode, made to measure for each specific machining operation.

Forms can even be produced which could not be obtained without great difficulty using classical milling, such as T-shaped grooves, for example, or moulds for reinforcement walls, or other contours calling for the creation of long and narrow recesses in hardened steel sheets. In fact, the present invention makes it possible to use long and narrow electrode tools for EDM milling, whilst conventional milling tools must be massive to be efficient, for otherwise it would be necessary to mill too slowly, to avoid breaking the tool.

Moreover, any form of electrode tool can be fitted to the device covered by the present invention. In fact, this device makes it possible to pilot the frequency of rotation of an electrode tool, whatever the dimensions and form of this tool may be, without the need for any programming changes.

Thus, thanks to the stability and reliability brought to machining by the device covered by the present invention, and also to its simplicity, this device helps to automate high-speed EDM milling easily and in a very satisfactory way.

I claim:

1. A rotatably driven spindle for securing and carrying along at high speed rotation a tool-holder, comprising:

a spindle body having a fastening component for connecting it rigidly to a moving part of a machining head, a spindle member carried within said spindle body, said spindle member including a rotatable member which rotates about an axis of symmetry, a cylindrical rod extending from said rotatable member and communicating with an inlet of said spindle, a channel within said cylindrical rod for communicating a liquid coolant from said inlet to said rotatable member to cool said spindle during rotation, a bore formed in an underside of said rotatable member for receiving an upper extremity of said tool-holder, clamping means for exerting on said tool-holder a force to retain said tool-holder within said bore, and a sealed coolant circuit able to provide said liquid coolant from said spindle through annular recesses between said rotatable member and said tool-holder and to an annular injection chamber, said annular injection chamber communicating said coolant to a surface of an electrode tool held by said tool-holder.

2. The spindle as described in claim 1, in which said bore and said extremity of said tool holder are conical in shape.

3. The spindle as described in claim 1, in which said spindle body has at least two carbon brushes pressed against said inlet channel by bracing components, and intended for the provision of machining current to said spindle member and tool-holder.

4. The spindle as described in claim 1, further comprising a motor for rotatably driving said spindle, said motor is mounted in said spindle body and operates a gear mounted on said spindle member.

5. The spindle as described in claim 4, in which said motor is mounted on said moving part of said machining head and said spindle is equipped with a connecting element comprising a drive belt linking said motor to said spindle member.

6. The spindle as described in claim 5, in which said connecting element is equipped with features intended to work together with corresponding features located below said rotary motor.

7. The spindle for electro-erosion milling as described in claim 4, in which said motor is adjustable in such a way that the rotation speed of said spindle member is controlled by the variation of a parameter measured during machining.

8. The spindle as described in claim 4, in which said motor is equipped with an encoder for positioning said spindle member and said tool-holder in a given angular position.

* * * * *